Figure 1:
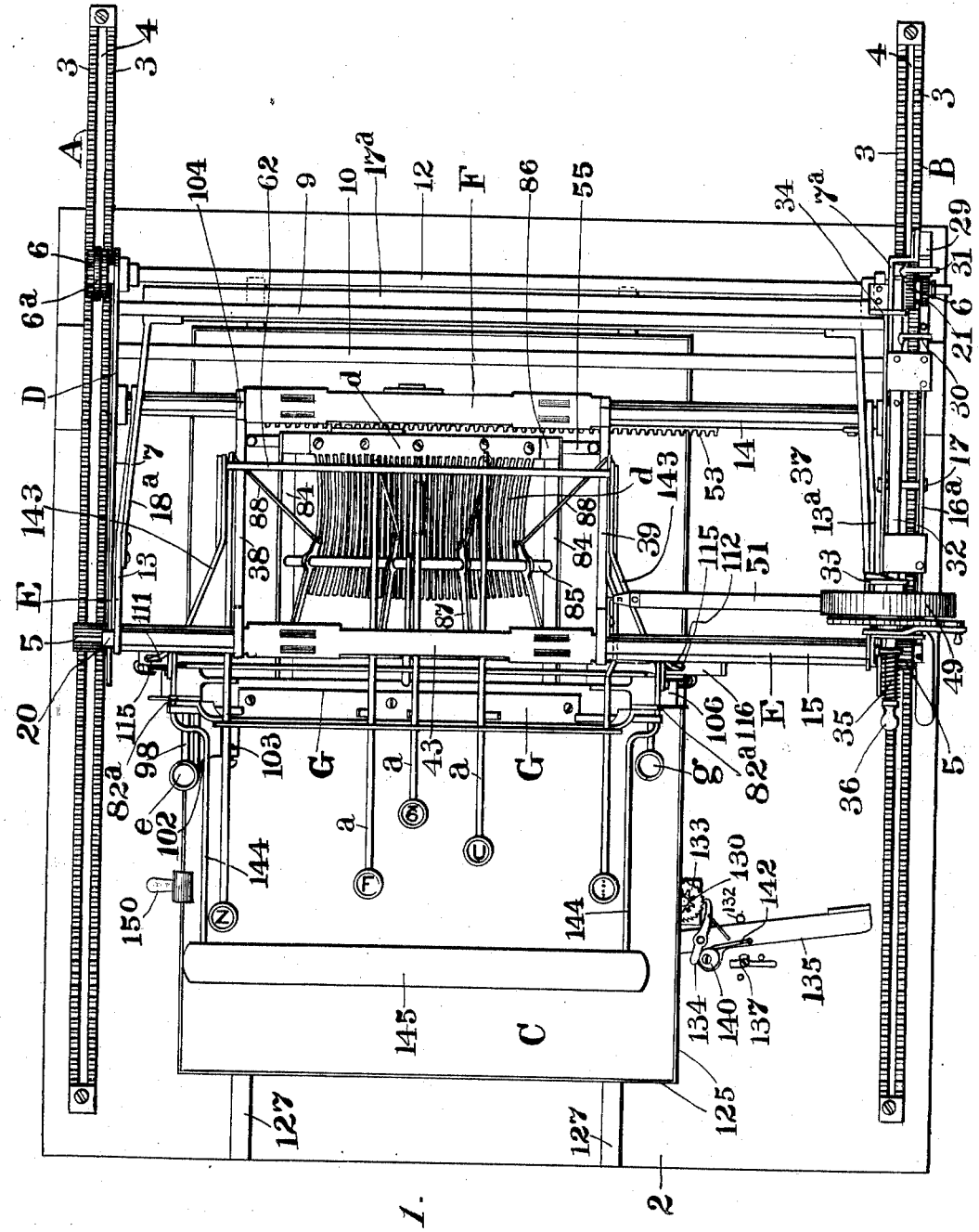

No. 759,816. PATENTED MAY 10, 1904.
J. H. W. MARRIOTT.
TYPE WRITING MACHINE.
APPLICATION FILED MAR. 19, 1903.
NO MODEL. 9 SHEETS—SHEET 1.

Witnesses
Percy C. Bowen
Bernard N. Booty

Inventor
J. H. W. Marriott
By Robert Watson
Attorney

No. 759,816. PATENTED MAY 10, 1904.
J. H. W. MARRIOTT.
TYPE WRITING MACHINE.
APPLICATION FILED MAR. 19, 1903.
NO MODEL. 9 SHEETS—SHEET 3.

Witnesses
Percy C Bowen
Bernard W. Boutz

Inventor
J. H. W. Marriott
By Robert Watson
Attorney

No. 759,816. PATENTED MAY 10, 1904.
J. H. W. MARRIOTT.
TYPE WRITING MACHINE.
APPLICATION FILED MAR. 19, 1903.
NO MODEL. 9 SHEETS—SHEET 4.

Witnesses
Percy C Bowen
Bernard W Boutz

Inventor
J.H.W. Marriott
By Robert Watson
Attorney

No. 759,816. PATENTED MAY 10, 1904.
J. H. W. MARRIOTT.
TYPE WRITING MACHINE.
APPLICATION FILED MAR. 19, 1903.
NO MODEL. 9 SHEETS—SHEET 7.

Witnesses
Bernard H. Bouty
Gaffer L. _____

Inventor
J. H. W. Marriott
By Robert Watson
Attorney.

No. 759,816. PATENTED MAY 10, 1904.
J. H. W. MARRIOTT.
TYPE WRITING MACHINE.
APPLICATION FILED MAR. 19, 1903.
NO MODEL. 9 SHEETS—SHEET 8.

Witnesses
Percy C. Bowen
Bernard N. Boutz

Inventor
J. H. W. Marriott
By Robert Watson
Attorney

No. 759,816. PATENTED MAY 10, 1904.
J. H. W. MARRIOTT.
TYPE WRITING MACHINE.
APPLICATION FILED MAR. 19, 1903.
NO MODEL. 9 SHEETS—SHEET 9.
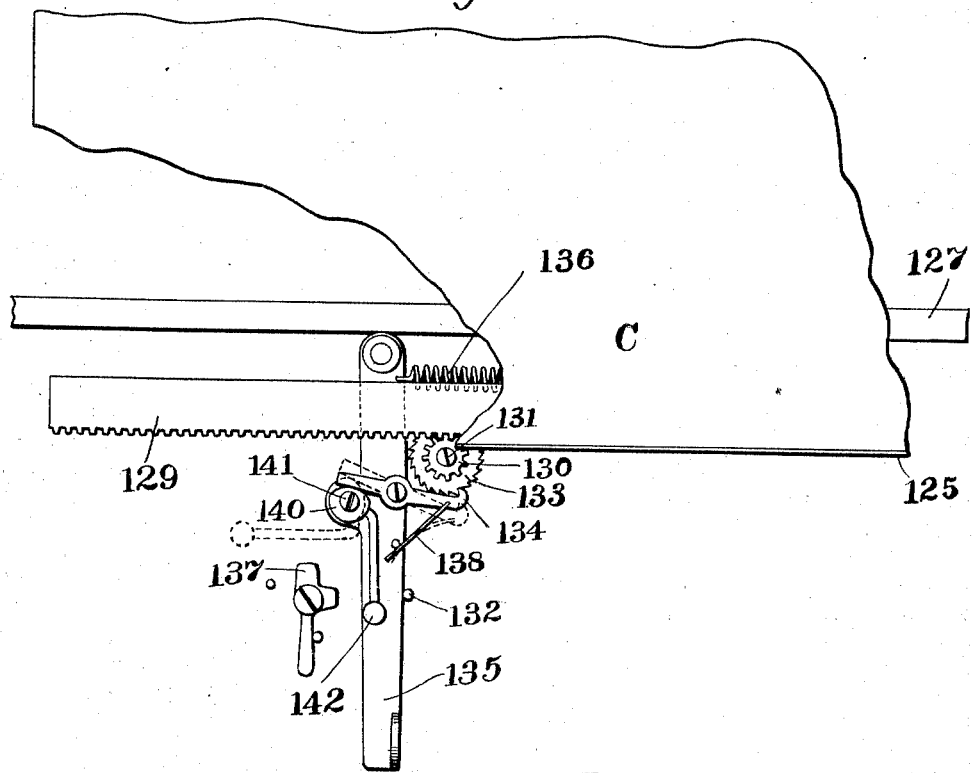
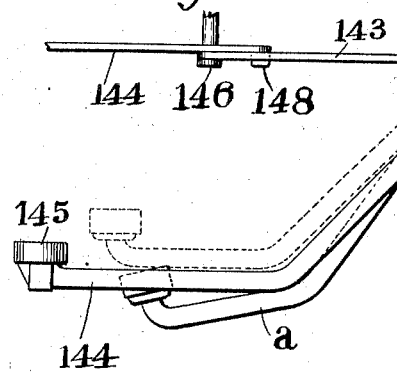
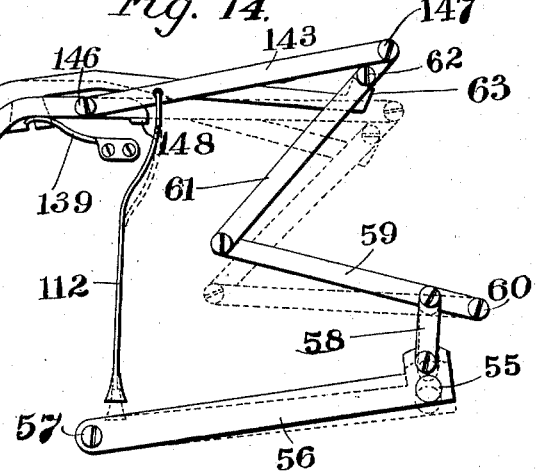
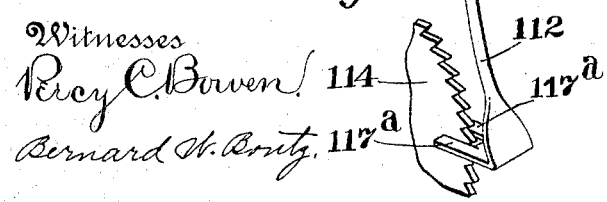

No. 759,816.

Patented May 10, 1904.

UNITED STATES PATENT OFFICE.

JAMES H. W. MARRIOTT, OF RUXTON, MARYLAND.

TYPE-WRITING MACHINE.

SPECIFICATION forming part of Letters Patent No. 759,816, dated May 10, 1904.

Application filed March 19, 1903. Serial No. 148,611. (No model.)

*To all whom it may concern:*

Be it known that I, JAMES H. W. MARRIOTT, a citizen of the United States, residing at Ruxton, in the county of Baltimore and State of Maryland, have invented certain new and useful Improvements in Type-Writing Machines, of which the following is a specification.

The purpose of my invention is to provide a type-writing machine adapted for writing upon flat surfaces, such as the pages of a book or sheets of paper placed upon a flat platen or printing-bed. To this end the writing-machine is arranged upon fixed guideways which are supported at a suitable distance above the printing-surface and carry the entire weight of the machine, and mechanism is provided for spacing the machine longitudinally of said guideways to print successive lines, this movement of the machine being necessary for printing upon the pages of heavy books. In addition to the provision for moving the machine for line-spacing I also provide a platen upon guideways arranged between the machine-guideways and beneath the machine and mechanism for spacing the platen rearwardly, so that for light work, such as printing upon separate sheets of paper, the platen may be moved for line-spacing instead of moving the machine. As the machine is adjustable upon the machine-guideways, it may be set in any desired position at a convenient distance from the operator, and in printing upon separate sheets of paper—such as letter-heads, bill-heads, and other account-sheets—the platen carrying the work is spaced away from the operator instead of spacing the machine toward the operator. While it is necessary in book-work to space the machine, it is desirable to avoid changing the position of the machine relatively to the operator and to avoid the necessity of reaching or bending forward to operate the keys while printing at the top of a page, and for that reason I have provided a machine in which where the nature of the work requires it the machine may be spaced, but in which for lighter work which admits of being readily moved the machine itself remains stationary and the platen carrying the work is spaced for successive lines of printing.
The writing-machine comprises a main supporting frame or carriage movable upon the machine-guideways for line-spacing, a tilting carriage-frame journaled in said main supporting-frame, a type-frame carriage movable upon said tilting carriage-frame for letter-spacing, a rocking or tilting type-frame journaled upon a horizontal axis in said type-frame carriage, and printing mechanism carried by said type-frame and comprising a series of type-bars arranged radial to the printing-point, each type-bar having two or more printing characters with their faces arranged in different planes and key-levers for operating said type-bars. The members of the escapement devices for releasing the type-frame carriage for letter-spacing are arranged upon said carriage and the tilting carriage-frame, respectively, and the universal bar is arranged to rock with the type-frame, and in order to permit said type-frame to rock without operating the escapement mechanism the member of said mechanism upon the type-frame carriage is connected to the universal bar by flexible connections which permit such rocking motion and which cause the operation of the escapement devices when a type-key or the spacing-key is depressed.

The machine embodies various other improvements, the construction and operation of which will be pointed out in the following specification and the accompanying drawings.

Figure 2:
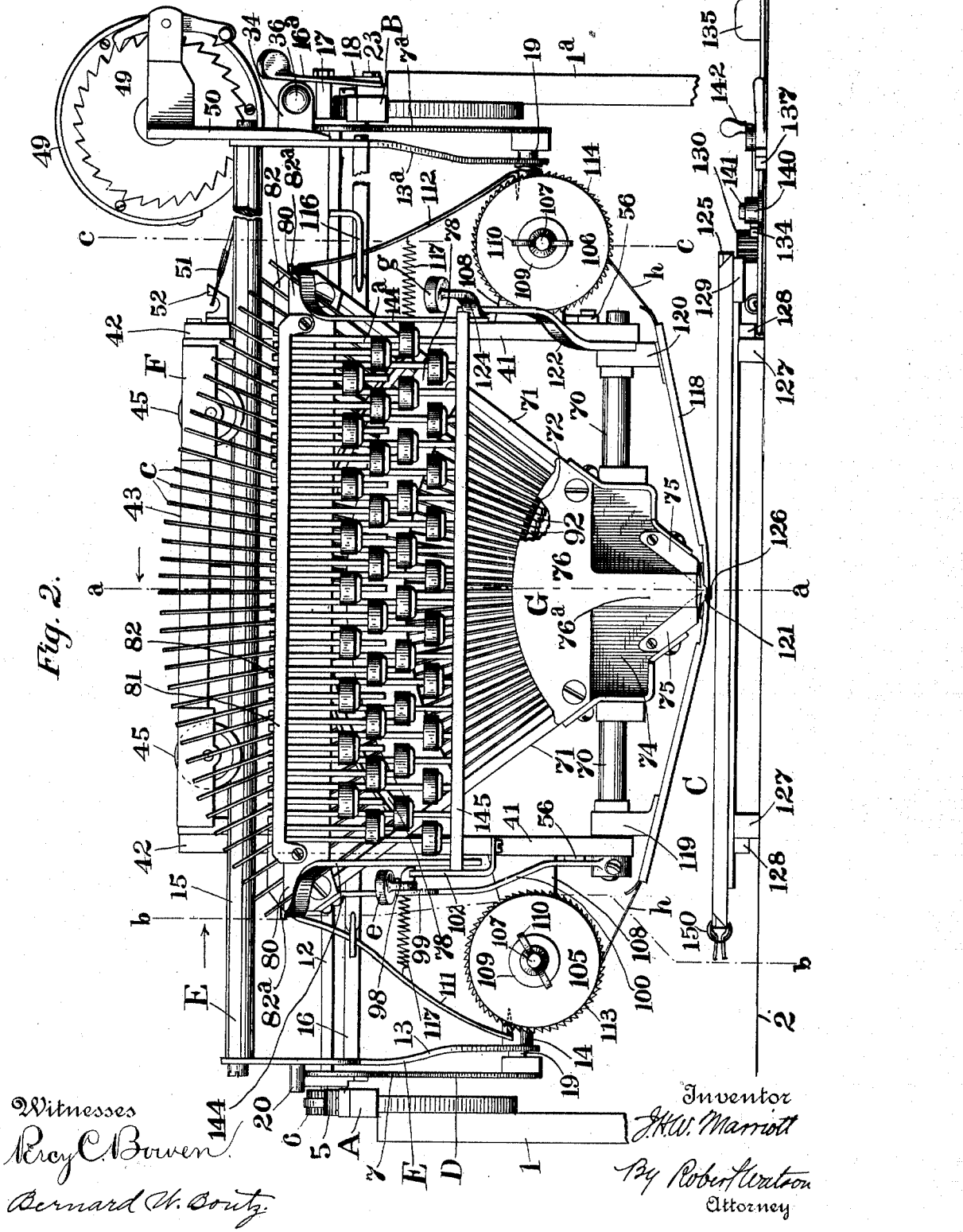
Figure 3:
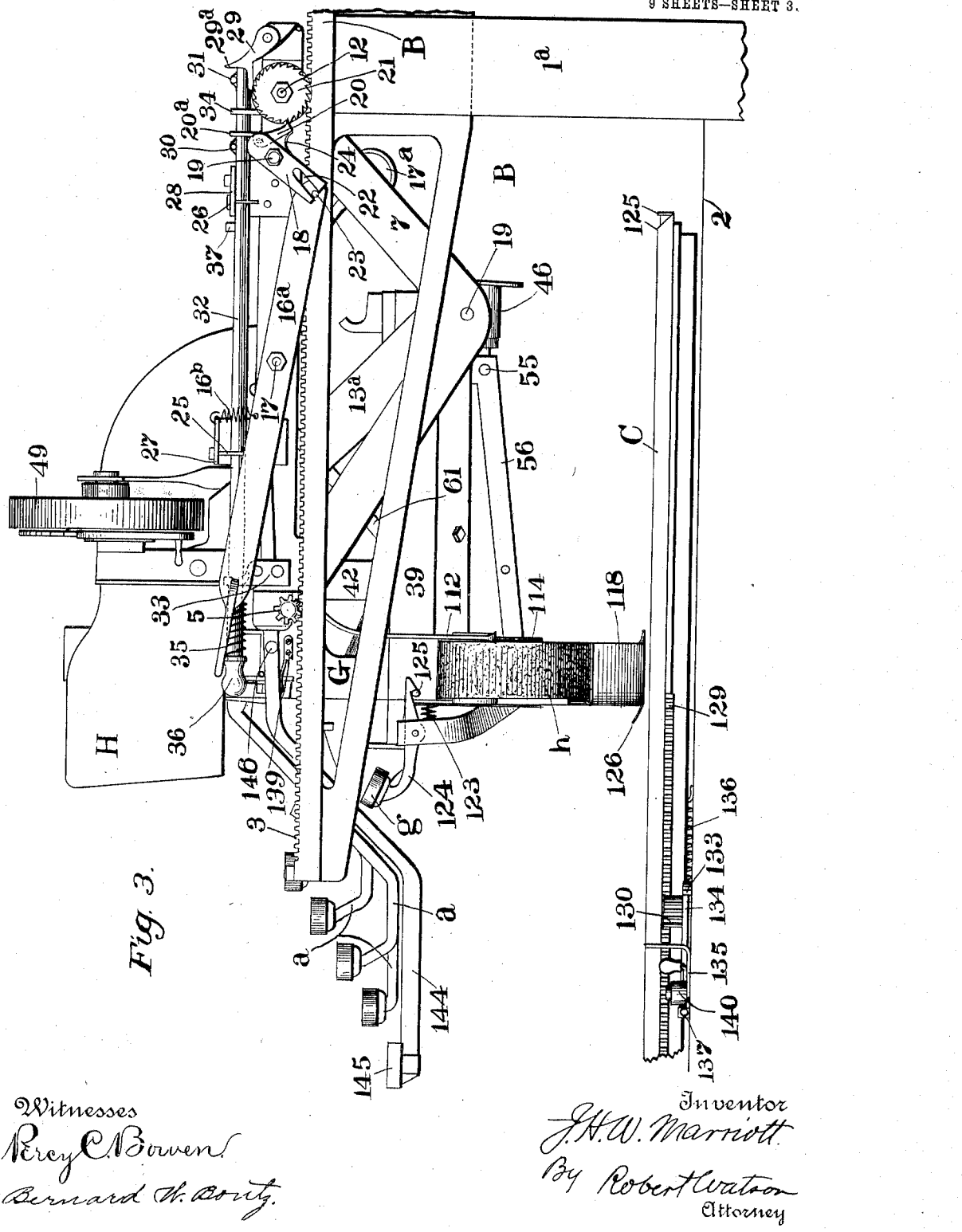
Figure 4:
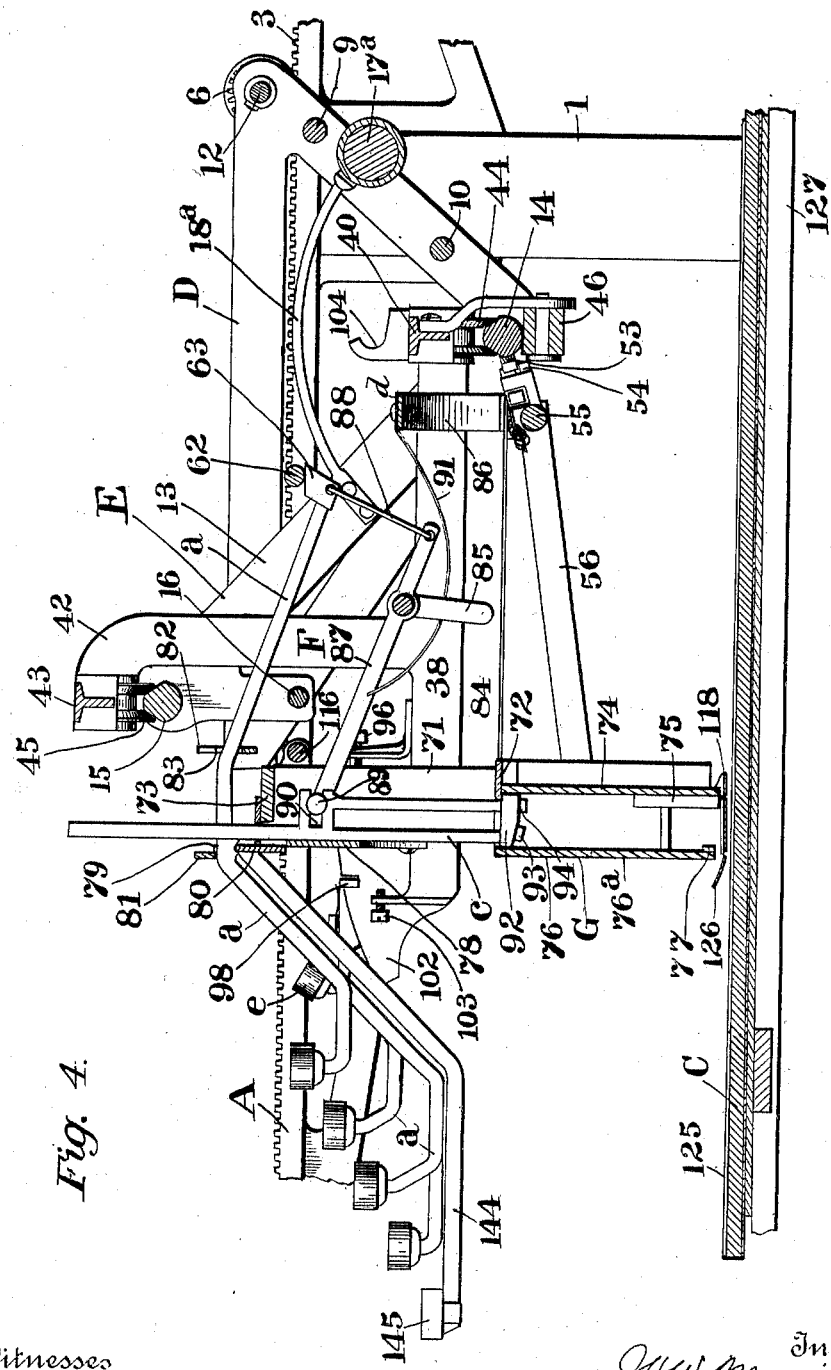
Figure 5:
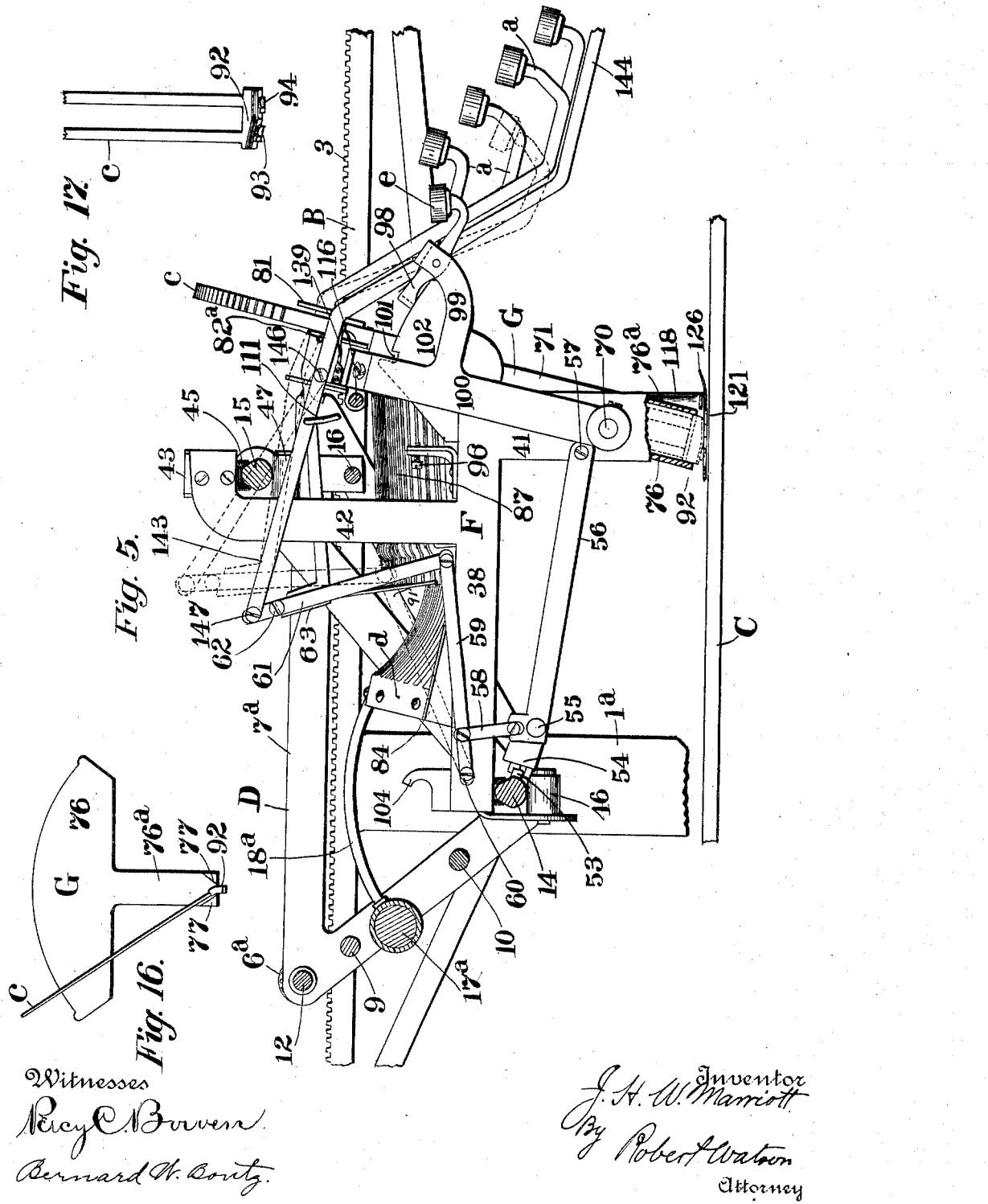
Figure 6:
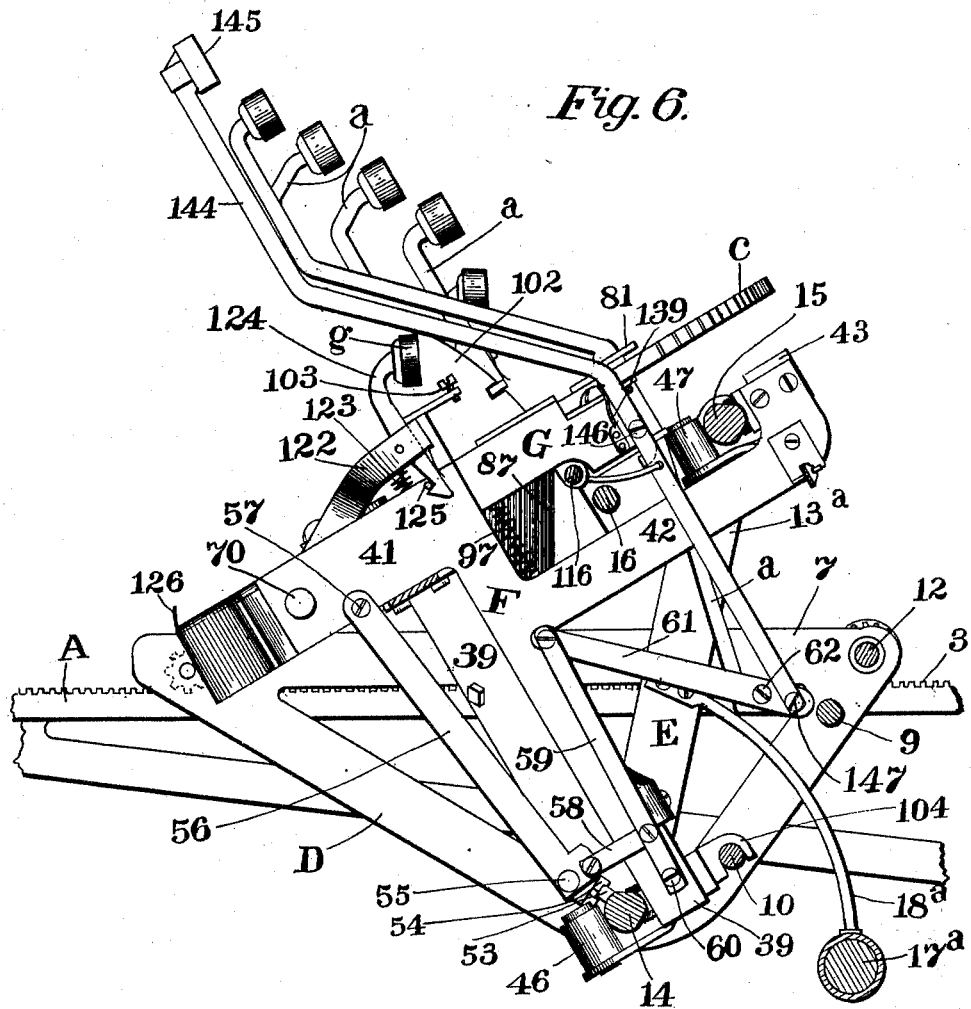
Figure 7:
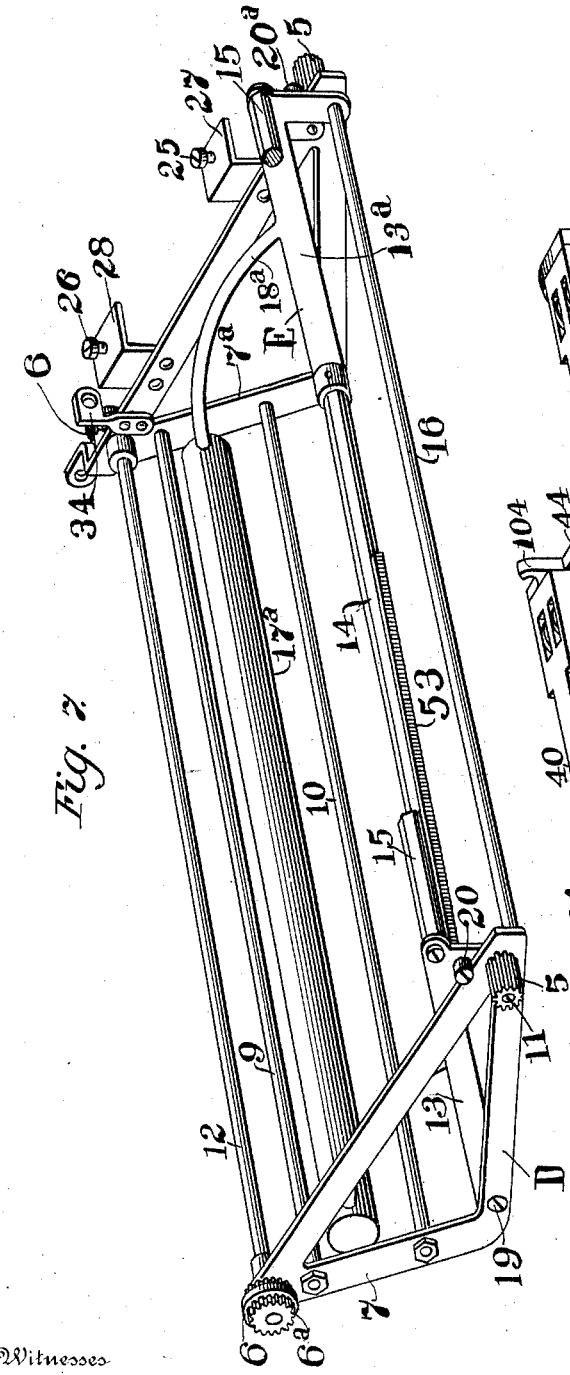
Figure 8:
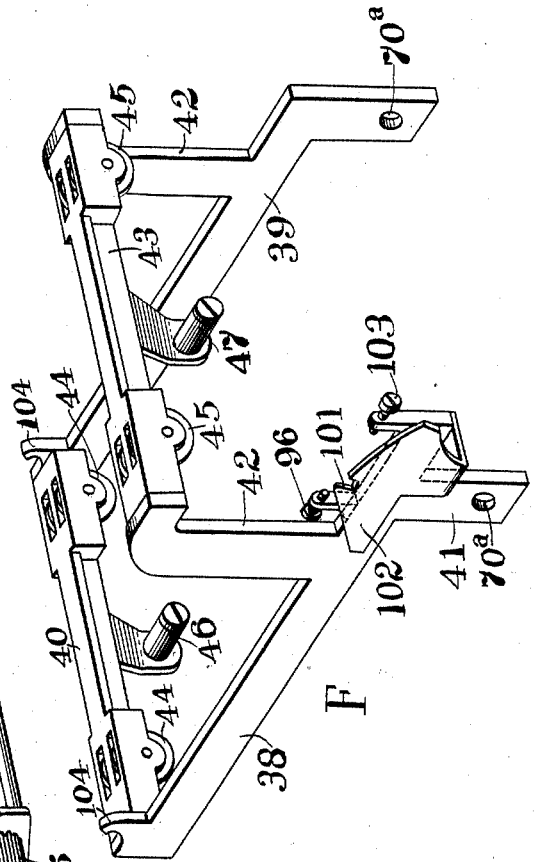
Figure 9:
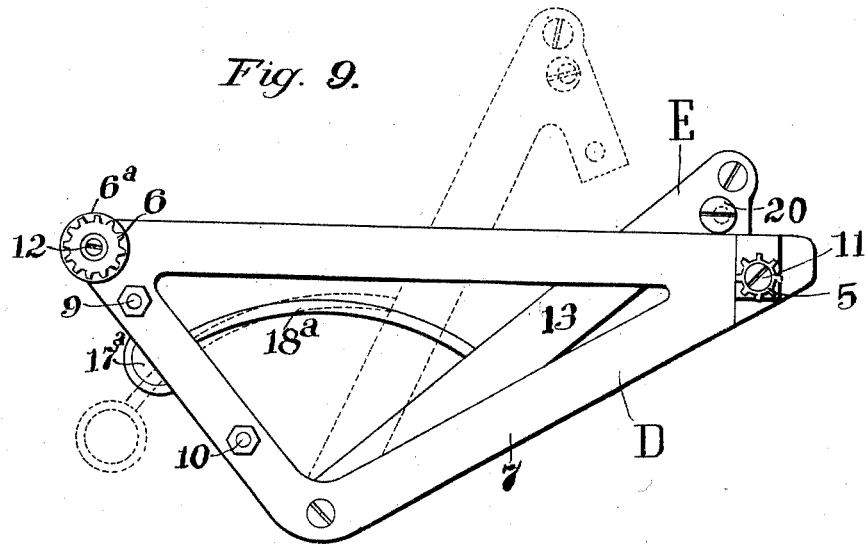

In the drawings, Figure 1 is a top plan view of the writing-machine, platen, and supporting-table, various parts of the machine being omitted. Fig. 2 is a front elevation of the machine and platen. Fig. 3 is a right-hand side view of the same with the cover or casing arranged upon the top of the machine. Fig. 4 is a vertical section through the machine on the line *a a* of Fig. 2, some of the parts in the rear being omitted. Fig. 5 is a similar view on the line *b b* of Fig. 2. Fig. 6 is a similar view on the line *c c* of Fig. 2, the writing-machine being tilted upward away from the printing-surface. Fig. 7 is a perspective view of the main supporting frame or carriage and the tilting carriage-frame which is journaled therein. Fig. 8 is a similar view of the type-frame carriage which travels upon the tilting carriage-frame. Fig.

Figure 10:
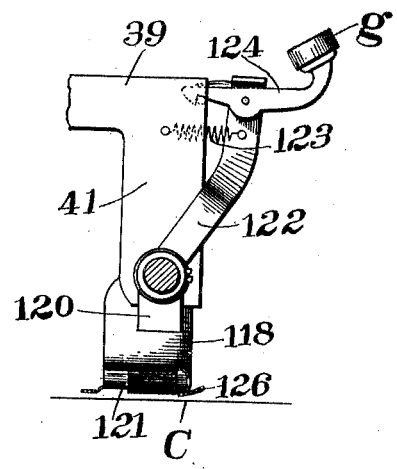
Figure 11:
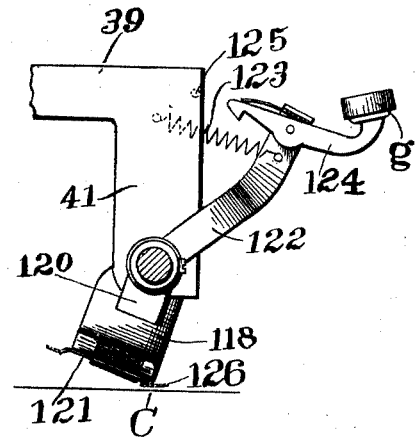

9 is a side view of the main supporting-carriage and the tilting carriage-frame, the movement of the latter being indicated in dotted lines. Figs. 10 and 11 are side views of the parts for shifting the ribbon-guide rearwardly to inspect the printing-line, said guide being shown in central transverse section. Fig. 12 is a plan view of the platen line-spacing mechanism and portions of the platen. Fig. 13 is a top plan view of the adjacent ends of one of the space-key levers and one of the links which connect the universal bar to the type-frame. Fig. 14 is a side view of the spacing-key levers, a type-key lever, a ribbon-moving pawl, and the flexible connections between the frame, the universal bar, and the bar which supports the movable member of the escapement mechanism, the normal positions of said parts being indicated in dotted lines and the full lines indicating their positions when a type-key is depressed. Fig. 15 is an enlarged perspective view of a ribbon-pawl and a portion of one of the ribbon-spool ratchet-wheels. Fig. 16 is a rear elevation of the front guide-plate on the type-frame and part of one of the type-bars, and Fig. 17 is a side view of part of a type-bar.

Referring to the drawings, A and B indicate a pair of parallel rails or guideways supported horizontally at a suitable distance apart from and independently of the platen C or other printing bed or surface by standards or uprights 1 and 1ª, Fig. 2, which are secured to the guideways and to a supporting-table 2. Parallel toothed racks 3 are arranged upon the upper edge of each rail a short distance apart, leaving between the racks of each rail or guideway a channel 4.

*Main supporting frame or carriage.*—A main supporting frame or carriage D for the printing mechanism, Figs. 4 to 8, inclusive, is suspended between the machine-guideways A and B by means of a pair of wide pinions 5, each engaging both racks of a guideway, and a pair of double pinions 6, each engaging both racks of a guideway and having a central rib or disk 6ª, which extends into the channel 4. The main supporting-frame D, Fig. 7, consists of a pair of similar triangular side plates or hangers 7 and 7ª and cross-bars 9 and 10, connecting said hangers with one another. The pinions 5 are journaled upon studs 11, secured to the forward ends of the hangers, and the pinions 6 are fixed to the ends of a shaft 12, which is journaled in the rear ends of the hangers. The disks 6ª, fitting within the channels 4, prevent any side play of the frame, and as all of the pinions have a wide bearing on the racks the frame is held rigidly against any twisting tendency in operation.

*Tilting carriage-frame.*—A tilting carriage-frame E, consisting of two similarly-formed side pieces 13 13ª, secured together by cross-bars 14, 15, and 16 and having a counterweight 17ª secured to its side pieces by rearwardly-extending arms 18ª, is pivotally mounted in the lowermost parts of the hangers 7 and 8 upon pivot-screws 19 in said hangers. The forward end of the frame E is supported by eccentric screws 20 and 20ª, threaded into the side pieces 13 13ª and resting upon the upper edges of the hangers 7 and 7ª, respectively. The bars 14 and 15 constitute tracks or ways upon which the type-frame carriage F (see Fig. 8) travels transversely of the platen for letter-spacing.

*Machine line-spacing mechanism.*—The frames D, E, and F and the printing mechanism carried thereby are movable longitudinally of the machine-guideways with a step-by-step motion for line-spacing by means of a lever 16ª, (see Figs. 1, 2, and 3,) fulcrumed upon a stud 17, projecting laterally from the hanger 7ª, a short lever 18, fulcrumed upon a stud 19, also secured to said hanger, and a spring-pawl 20, pivoted to one end of the short lever and engaging a ratchet-wheel 21, secured upon the end of the pinion-shaft 12. The levers 16ª and 18 lie normally at an angle to one another, as shown, the lever 18 having a slot 22, which is engaged by a pin 23 upon the lever 16ª, and the latter being held in the position shown by a spring 16ᵇ, connected to the lever and to a bracket 27 upon the hanger 7ª. The pawl is held in engagement with the ratchet-wheel by a spring 24. The arrangement is such that when the forward end of the spacing-lever 16ª is depressed the pawl will be depressed and the ratchet-wheel and shaft 12 will be turned, thereby causing the pinions 6, which engage the rack, to move the machine forward, as will be evident from an inspection of the drawings. The distance to which the machine moves at each operation of the spacing-lever is determined by adjustable stops 25 and 26, which are supported by brackets 27 and 28 upon the hanger 7ª. These stops limit the movement of the spacing-lever in both directions. A spring holding-pawl 29, pivoted to the hanger 7ª, normally prevents backward rotation of the ratchet-wheel, and hence prevents backward movement of the entire mechanism. The moving pawl 20 and the holding-pawl 29, which are pivoted at opposite sides of the ratchet-wheel, are provided with upwardly-extending arms 20ª and 29ª in line with pins or projections 30 and 31, secured to a longitudinally-movable push-rod 32, mounted in bearings 33 and 34 at opposite ends of the hanger 7ª. A spring 35, interposed between the bearing 33 and a knob 36 at the forward end of the push-rod, normally holds said rod in its forward position with the pins 30 and 31 out of engagement with the arms upon the pawls. When it is desired to move the machine rearwardly upon the machine-guideways, however, the push-rod is pressed backward and the pins 30 and 31 engage the arms upon the pawls and lift both pawls out of engagement with the ratchet-wheel. After the pawls have been disengaged a stop-pin 37 upon the push-rod engages the bracket 28 upon the supporting-frame, and the continued rearward pressure upon the push-rod then forces the machine rearwardly upon the ways. The mechanism may at any time be drawn forward upon the ways without operating the spacing-lever by simply grasping one of the cross-bars or any other convenient part of the machine and pulling it forward to the desired extent.

*Type-frame carriage.*—The carriage F, as shown in Fig. 8, consists of a rigid frame having parallel side bars 38 and 39, connected at their rear ends by a horizontal cross-bar 40 and having legs 41 at their forward ends and uprights 42 at intermediate portions of their lengths connected by a cross-bar 43. The bars 40 and 43 are parallel with one another and provided with grooved guide-wheels 44 and 45, which rest upon the guide-bars 14 and 15 of the tilting carriage-frame E. Rollers 46 and 47, supported by brackets depending from the bars 40 and 45 of the carriage, extend beneath the guide-bars 14 and 15, respectively, and prevent vertical movement of the carriage relatively to said guide-bars.

A spring-actuated drum 49 (see Figs. 1, 2, and 3) is mounted upon a bracket 50, secured to the right-hand side bar 13$^a$ of the tilting carriage-frame E, and a strap 51 upon said drum has one of its ends connected to a hook 52 upon the carriage F. The guide-bar 14, which rocks with the frame E, has on its forward side a rack 53, which is engaged by a dog 54, secured to a transverse vertically-movable bar 55. This bar 55, carrying the dog, has a pair of arms 56, Figs. 4, 5, 6, and 14, secured to its ends, and the forward ends of said arms are journaled upon pivot-pins 57, secured to the outer sides of the depending legs 41 of the carriage-frame F. The bar 55 and connected arms form a bail which holds the dog opposite the rack. The rear ends of the arms 56 of the bail are supported by links 58 from levers 59, the rear ends of which are journaled upon pivot-pins 60 near the rear of the side-bars 38 and 39 of the carriage-frame F. The links 58, as shown, are connected to the levers 59 near the rear ends of the latter, and the forward ends of said levers are pivoted to upwardly-extending rods 61, which latter are connected together near their upper ends by a universal bar 62, extending transversely of the machine. The universal bar rests upon the rear ends of the type-key levers *a* or upon projections 63 secured to said levers.

The key-levers are fulcrumed centrally upon a tiling type-frame G, hereinafter described, and the universal bar is held in its position over the ends of the type-key levers by a pair of links 143, journaled at their forward ends upon pivot pins or studs 146, secured to the type-frame and connected at their rear ends to the upper ends of the rods 61 by pivot-pins 147. The universal bar is therefore caused to follow the rocking movement of the type-frame by reason of the links 143. Instead of connecting the links to the rods 61 the same purpose would be answered if their rear ends were journaled upon the universal bar, the object being to connect said bar with the type-frame and hold it in position over the key-levers, while permitting its free upward movement when a type-key or the spacing-key is depressed. It will be evident that when the rear end of a key-lever is raised and lowered by the depression and release of a type-key the universal bar will be raised and lowered, thereby causing the dog to oscillate vertically and permit the carriage to be drawn to the right one space by the actuating-spring.

A pair of space-key levers 144 at opposite sides of the machine are journaled at their rear ends upon studs or pins 146 and are connected at their forward ends to a spacing-key 145, arranged transversely at the front of the keyboard. These space-key levers, as shown in Figs. 13 and 14, extend rearwardly for a short distance beyond their pivotal points, and shoulders 148 upon said rearward extensions project laterally beneath the links 143. The space-key levers are supported by springs 139, secured to the type-frame, which springs hold the levers against pins or shoulders 82$^a$, projecting from the ends of the slotted guide-bar 80. It will be seen from an inspection of Fig. 14 that when a type-key is depressed the universal bar and the dog and intermediate connecting parts will be raised from their normal positions (shown in dotted lines in said figure) into the positions shown in full lines without disturbing the spacing-key levers. When the spacing-key is depressed, the shoulders 148 at the rear ends of said levers raise the links 143 and cause the escapement mechanism to be actuated without disturbing the type-key levers.

*Type-frame.*—The type-key levers and spacing-key levers are fulcrumed in the upper part of a vertically-arranged triangular type-frame G, Fig. 2, which is pivotally supported on trunnions 70, secured to the sides of the frame near their lower ends and journaled in openings 70$^a$ in the depending legs 41 of the carriage-frame F, Fig. 8. The type-frame comprises two straight side pieces 71, converging toward their lower ends and having secured therebetween a lower arched guide-plate 72 and an upper arched guide-plate 73, said guide-plates being provided with suitable transverse guide-slots, within which are arranged a series of type-bars *c*, radial to the printing-point at the lower end of the frame. A flat guide-plate 74 is arranged at the rear of the frame and provided with converging guide-blocks 75, Figs. 2 and 4, for directing the type-heads to the printing-point. A plate 76 (see Fig. 16) is secured to the front of the frame and provided with a depending arm 76ª, which extends to the apex of the frame and is provided with guide-blocks 77 thereon for the type-heads. The arm 76ª, as shown, is slightly shorter than the rear plate 74, so as to support the guide-blocks 77 a little above the blocks 75 and in order to prevent the arm from striking the printing-surface when the frame is tilted into the position shown in Fig. 5. When the frame is tilted into this position, the blocks 77 guide the forward ends of the type-heads close to the printing-point. An arched plate 78, which also guides the type-bars, is arranged across the front of the frame. The type-key levers *a* are fulcrumed within slots 79 in the upper edge of a fulcrum-plate 80, secured to the upper ends of the side pieces 71, and they are prevented from being moved vertically out of the slots by a guard 81, secured to the fulcrum-plate 80 and extending over the key-levers. The key-levers are held in alinement and parallel with one another by a guide-plate 82, extending across the rear side of the type-frame and having vertical slots 83 in line with the slots in the fulcrum-plate 80.

A pair of parallel arms 84, Figs. 1, 4, and 5, extend rearwardly from the side pieces of the type-frame, and secured between these arms is an arched fulcrum-bar 85 and a similarly-arched spring supporting-bar 86, the latter being in the rear of the bar 85. The type-bars are operated by a series of intermediate levers 87, fulcrumed on the arched fulcrum-bar 85, each intermediate lever having its rear end connected by a link 88 to a key-lever *a* and having at its forward end a laterally-projecting stud 89, which extends into a horizontal slot 90 in one of the type-bars. The type-bars are held in their normal positions by the fingers 91 of a comb-spring *d*, the rear end or continuous portion of which is secured to the arched spring supporting-bar 86. The forked ends of these spring-fingers engage the lower edges of the levers 87 between the fulcrum-bar and the type-bars and press the forward ends of said levers upwardly.

The depression of a key, it will be seen, causes an upward pull upon the link 88, which in turn rocks the intermediate lever 87 and forces the type-bar downwardly to the printing-point. When the key is released, the parts are returned to their normal positions by the spring.

Each type-bar is provided with a type-head having two or more types or printing characters arranged with their faces in different planes. In the drawings, Figs. 4 and 5, each type-head 92 is provided with two printing characters 93 and 94, arranged one in front of the other. The rear types 94 on the type-heads represent lower-case letters and are arranged to print when the type-frame is in its vertical position, (shown in Fig. 4,) and the forward or upper-case characters 93 have their faces arranged in planes such that they will be parallel with the printing-surface when the type-frame is tilted forward, as shown in Fig. 5.

The type-frame is normally drawn toward its vertical position against an adjustable stop 96, Figs. 4, 5, and 8, by a spring 97, Fig. 6, which is attached to the type-frame and to the type-frame carriage F, and it is normally locked in this position by a latch-lever 98, Figs. 2 and 5, fulcrumed upon an arm 99 of an upright bar 100, which bar is secured at its lower end to the left-hand trunnion 70 of the type-frame and at its upper end to the top of the type-frame. The rear end of this latch-lever engages a slot 101 in a plate 102, which is attached to the side bar 38 of the carriage F. A shifting-key *e* is arranged upon the outer end of the latch-lever, and by depressing and bearing in a forward direction upon this key the type-frame may be swung forward upon its trunnions into the position shown in Fig. 5 against an adjustable stop-pin 103, Figs. 1, 4, 6, and 8, which pin is carried by a bracket attached to the bar 38 of the carriage F. In this position the faces of the upper-case letters are brought parallel with the printing-surface and in position to print upon the line, and, as shown in dotted lines in Fig. 5, the lower-case letters at the rear of the type-heads do not touch the printing-surface when the type-bars are depressed.

As the type-key levers, the spacing-key levers, and the universal bar, which is held in place above the ends of the type-key levers by the links 143, tilt bodily forward and backward with the type-frame, the relations of these parts to one another and to the type-frame do not change with the movement of said frame. As the position of the universal bar relatively to the dog changes when the type-frame is tilted, a rigid connection between said universal bar and dog would cause the dog to move out of engagement with the rack 53 when the type-frame is tilted. It is therefore essential to provide flexible connections between the universal bar and dog or other escapment mechanism—such, for instance, as the parts 58, 59, and 61, heretofore described—so as to permit relative movement between the type-frame and its carriage without operating or disengaging the dog. When the type-frame is in its normal or vertical position relatively to the carriage, the parts 58, 59, and 61 stand in the relation to one another shown in Fig. 6 and in dotted lines in Fig. 14. When the type-frame is tilted forward, the rods 61, to which the universal bar is connected, rock about their points of connection with the rods 59 and form a greater angle with said rods, as shown in full lines in Fig. 5. The forward ends of the rods 59 are caused to move upward slightly with the tilting of the type-frame; but as the links 58 are connected near to the rear pivoted ends of the rods 59 and to the forward ends of the rods 56, which carry the dog, the movement imparted to the dog is negligible and not sufficient to operate it. When a key is depressed, however, as indicated in dotted lines in Fig. 5 and in full lines in Fig. 14, the universal bar is raised by the key-lever and the rods 61 59, links 58, and levers 56 all move upwardly to a sufficient extent to permit the dog to act and allow the carriage to move laterally one space for letter-spacing.

When it is desired to inspect the sheet which is being printed upon, the tilting carriage-frame, carriage, and type-frame carrying the printing mechanism may be tilted backward away from the platen or printing surface, as shown in Fig. 6 until a pair of stops 104, upon the rear bar 40 of the carriage F, rest against the cross-bar 10, which is secured to the hangers of the main supporting-carriage D. The parts will then be held in this position by reason of the rearwardly-suspended counterweight 17$^a$.

The entire printing mechanism may be thus tilted in the supporting-carriage away from the printing surface or platen, or the supporting-carriage and printing mechanism may be moved rearwardly along the machine-guideways away from the platen or printing area.

The arrangement of the type upon the type-bars is shown in Figs. 16 and 17. The type-bars *c* are arranged radial to the printing-point, and the type-heads 92 are perpendicular to the printing-point. The type-bars at each side of the center of the machine are connected to their respective heads at angles which vary with the inclination of the bars. The faces of the type upon the type-heads also lie in different planes. As the normal position of the type-frame is perpendicular to the writing-surface, the lower-case letters 94 stand normally parallel with the writing-surface, while the upper-case letters 93 are arranged at such an angle to the lower-case letters that they will lie parallel to the printing-surface when the type-frame is tilted forward against the stop 103.

*Ribbon movement.*—The inking-ribbon *h* is wound on spools 105 and 106, which are rotatably mounted on horizontal spindles 107, secured to brackets 108, the latter being connected to and projecting laterally outward from the depending legs 41 of the carriage F, as shown in Fig. 2. The spools are held with sufficient friction to prevent them from turning loosely on the spindles by means of spring-disks 109, interposed between the spools and adjustable nuts 110 upon the spindles. Pawls 111 and 112, pivotally connected at their upper ends to the links 143 (see Fig. 16) in the rear of the pivotal points of the latter, are arranged to engage ratchet-wheels 113 and 114 on the ribbon-spools 105 and 106, respectively. These pawls extend through slots 115, Fig. 1, in the opposite ends of a sliding ribbon-shifting bar 116, which is supported in suitable bearings connected with the type-frame, and the pawls are normally drawn toward the ratchet-wheels by springs 117. The arrangement is such that when the bar 116 is moved to the left the left-hand pawl 111 will be thrown out of engagement with the ratchet-wheel 113 and the right-hand pawl will be drawn into engagement with the ratchet-wheel 114, as shown in Fig. 2. When the bar 116 is moved to the right, the left-hand pawl will engage the adjacent ratchet-wheel and the right-hand pawl will be thrown out of action. The details of the engaging ends of the pawls are shown in Fig. 15. As the upper ends of the pawls are attached to the links 143, which oscillate with the type-frame when the latter is tilted upon its trunnions, it is necessary to arrange the pawls so that they will not become disengaged from the ratchet-wheels, which are supported by the carriage, when the type-frame is tilted. In order to provide for this, guiding projections 117$^a$ are arranged at the sides of the hooked end of each pawl, as shown in Fig. 15, and these projections, which lie on opposite sides of the ratchet-wheel, hold the engaging end of the pawl in line with the ratchet-wheel.

Each time the links 143 are moved upward by the elevation of the universal bar in the act of depressing a key the pawls are moved upward, and the one which is in engagement with the ratchet-wheel moves the latter, which in turn causes a longitudinal movement of the ribbon.

The ribbon between the spools extends through a flat tubular guide 118, which guide extends beneath the type-frame and is connected near its opposite ends to bearings 119 and 120, which are journaled upon the trunnions 70. A slot 121 is formed in the center of said guide to permit the type-bars to strike the ribbon and impress the latter upon the printing-surface. The ribbon is held in its normal position beneath the type-frame by means of a lever 122, secured to the bearing 120, and a spring 123, connecting said lever with the carriage, as shown in Figs. 2, 3, 6, 10, and 11. A spring-latch 124, pivoted to the upper end of said lever, normally engages a pin 125 upon the carriage F and locks the ribbon-guide against movement. An upwardly-inclined pointer or indicator 126 is secured to the ribbon-guide in front of the printing-point.

When it is desired to inspect the line which is being printed upon, it is merely necessary to depress and bear forward upon a key *g*, secured to the spring-latch 124, and the ribbon-guide and ribbon will be moved rearwardly, as shown in Fig. 11, thereby exposing the line which is being written upon. The indicator, which moves rearwardly with the ribbon-guide, will then point to the position upon the printing-surface where the type will strike at the next depression of a key. When it is desired to set the machine so as to print at any given point in a line, the machine is moved with the ribbon-guide thrown backward until the point of the indicator is opposite the desired point on the printing-surface. The ribbon-guide key g is then released, and the next type depressed will print at the point indicated.

*Platen and platen-spacing mechanism.*—The writing-machine thus far described is applicable to writing upon flat surfaces, such as upon the pages of a book or separate sheets of paper placed upon a platen, and the machine may be moved, as hereinbefore described, to any desired position over such surfaces or moved rearwardly off of the printing-surface, or the type-frame and its carriage may be tilted backward away from the printing-surface without the necessity of lifting the weight of the entire machine and without disturbing the position of the supporting-carriage. In printing upon the pages of a large book it is necessary, of course, to place the machine at the rear portions of its guideways in order to print the lines on the upper portion of the page, and it is necessary to space the machine forward upon its guideways for the successive lines upon the page. The operator therefore must lean or reach forward to a considerable distance in order to write on the upper part of the page, and each successive line places the keys in a new position relatively to the operator. The operation of the machine in its rearmost position requires considerably more physical effort on the part of the operator than would be required if the machine were located in a fixed and convenient position upon the forward or central portions of the machine-guideways. In printing upon light work, such as bill-heads or manifest-sheets, therefore, I provide means for spacing the platen rearwardly for the successive lines, the machine being fixed in position upon the machine-guideways where it will be most convenient for the operator. The machine is shown in connection with such a movable platen. Bookwork of course requires a special supporting-table and devices for holding and adjusting the book. (Not here shown and unnecessary to illustrate.)

As shown in the drawings, the platen C consists of a flat printing-bed provided with ledges or guides 125, extending along two or more of its sides, for the purpose of readily squaring the paper upon the printing-bed, and the paper is clamped in position by suitable clamps 150. A pair of platen guide rails or ways 127 are secured upon the supporting-table between and parallel with the machine-guideways, and the platen is provided on its lower side with guide-pieces 128, which guide the platen upon the ways. A rack 129 (see Fig. 12) is secured to the lower side of the platen and extends along one of its longitudinal edges. This rack, the teeth of which project laterally, is engaged by a pinion 130, journaled upon a stud 131, which is vertically arranged upon the supporting-table. A ratchet-wheel 133 is secured to the pinion 130 and rotates therewith upon the stud. The ratchet-wheel is operated by means of a pawl 134 and a platen-spacing lever 135, to which said pawl is pivoted. This lever, as shown, is pivoted to the supporting-table near the adjacent platen guide-rail and extends substantially at right angles to the platen. The lever is normally drawn against a stop-pin 132 by a spring 136, connected to the lever and to the supporting-table. The lever has a limited movement between said stop 132 and an adjustable stop 137, arranged to limit the forward movement of the lever and to adjust such movement for line-spaces of different widths. The pawl is normally held in engagement with the ratchet-wheel by means of a spring 138, and when the free end or handle of the lever is pulled forward it will be evident that the platen will be moved rearwardly one space of the width for which the stop 137 is adjusted.

In order to permit the platen to be drawn forward freely, a cam 140 is pivotally mounted upon a stud 141, secured to the spacing-lever and provided with a suitable handle 142, by which it may be turned upon the stud. The cam is arranged at one side of the forward end of the centrally-pivoted pawl 134, and when the cam is in the position shown in full lines in Fig. 12 the pawl is free to engage and move the ratchet-wheel for line-spacing. When it is desired to move the platen forward, however, the cam is turned so that it bears against the side of the pawl and rocks the pawl about its pivotal point against the tension of the spring 138, and the pawl is thereby disengaged from the ratchet-wheel, as indicated in dotted lines in Fig. 12. The platen may thus be moved forward for the purpose of placing new sheets of paper upon it, and as there is nothing to obstruct its movement rearward it may easily be set in any desired position, and when the cam 140 is moved so as to release the pawl the platen may be spaced rearwardly for successive lines of printing by moving the platen-spacing lever 135.

The type-frame may be adjusted vertically relatively to the platen or printing surface by turning the eccentric-screws 20 and 20$^a$, so that the type will strike said surface properly when forced down between the type-head guides.

The operation of the machine will be fully understood from the foregoing description without further explanation. It will be obvious that instead of employing a fixed rack and a dog movable with the carriage this arrangement may be reversed, the rack being the movable member of the escapement mechanism and the dog being stationary with respect thereto, or other forms of escapement mechanism may be employed and various other alternative and modified arrangements of parts may be made within the scope of my invention.

A cover H, as shown in Fig. 3, is suitably secured to the type-frame carriage and extends over said carriage and the type-frame.

Having described my invention, what I claim, and desire to secure by Letters Patent of the United States, is—

1. The combination with machine-guideways and platen-guideways arranged substantially parallel with one another, of a writing-machine supported by and adjustable longitudinally of the machine-guideways, toward and from the operator, a flat platen adjustable longitudinally of the platen-guideways, toward and from the operator and mechanism for imparting a step-by-step movement to the machine for line-spacing.

2. The combination with machine-guideways and a writing-machine supported by and adjustable longitudinally of said machine-guideways, said machine comprising carriage guide-rails arranged transversely of the machine-guideways, a carriage movable along said rails, printing mechanism movable with the carriage and mechanism for moving said carriage step by step for letter-spacing, of platen-guideways arranged substantially parallel with the machine-guideways, and a flat platen adjustable along the platen-guideways below the writing-machine.

3. The combination with platen-guideways, a flat platen and means for spacing said platen longitudinally of said platen-guideways, of a writing-machine supported above the platen and comprising carriage guide-rails arranged transversely of the platen-guideways, a carriage movable along the carriage guide-rails, type-bars having type thereon movable with the carriage and arranged to print at a common printing-point, keys for operating said type-bars, and means controlled by the movement of said keys for spacing said carriage along the carriage guide-rails.

4. The combination with platen-guideways, a flat platen and means for spacing the platen along said guideways, of machine-guideways arranged parallel with the platen-guideways and a writing-machine adjustable longitudinally of said machine-guideways above the platen, said machine comprising carriage guide-rails arranged transversely of the machine-guideways, a carriage movable along the carriage guide-rails, printing mechanism movable with the carriage, and mechanism for imparting step-by-step movement to the carriage for letter-spacing.

5. The combination with platen-guideways, a flat platen and means for spacing the platen along said guideways, of machine-guideways arranged parallel with the platen-guideways, a writing-machine adjustable longitudinally of said machine-guideways above the platen, said machine comprising carriage guide-rails arranged transversely of the machine-guideways, a carriage movable along the carriage guide-rails, printing mechanism movable with the carriage, mechanism for moving said carriage for letter-spacing, and means for spacing the machine along the machine-guideways.

6. The combination with platen-guideways and machine-guideways arranged substantially parallel with one another, of a flat platen adjustable longitudinally of the platen-guideways, means for spacing said platen away from the operator, a writing-machine adjustable longitudinally of the machine-guideways above the platen, and means for spacing said machine toward the operator.

7. The combination with machine-guideways, of a writing-machine supported thereby and adjustable thereon above the printing-surface, said machine comprising a type-frame carriage movable transversely of the printing-surface, a type-frame pivotally mounted in said carriage, and arranged to rock about a horizontal axis, type-bars carried by said frame, each bar having two or more printing characters with their faces arranged in different planes, and mechanism for moving said type-frame longitudinally and transversely of said guideways for line and letter spacing.

8. The combination with platen-guideways, a platen, and means for spacing said platen longitudinally of the guideways, of a writing-machine supported above the platen and comprising a type-frame arranged to rock about a horizontal axis, type-bars carried by said frame, each bar having two or more printing characters thereon with their faces arranged in different planes, and mechanism for moving said type-frame for letter-spacing.

9. In a type-writing machine, the combination with a flat platen and means for moving the same for line-spacing, of a type-frame carriage supported above the platen on suitable ways, mechanism for imparting movement to said carriage transversely of the platen for letter-spacing, a type-frame pivotally mounted in the carriage and arranged to rock about a horizontal axis, and a series of type-bars carried by said frame, each bar being provided with two or more printing characters having their faces in different planes.

10. In a type-writing machine, the combination with a flat platen and means for moving the same for line-spacing, of a type-frame carriage supported above the platen on suitable ways, mechanism for imparting movement to the carriage transversely of the platen for letter-spacing, a type-frame pivotally mounted in the carriage and arranged to rock about a horizontal axis, and a series of type-bars and operating-keys therefor carried by said frame, each bar being provided with two or more printing characters having their faces in different planes.

11. In a type-writing machine, the combination with machine-guideways supported independently of and apart from the printing bed or surface, of a type-frame carriage supported by said ways above the printing-surface, mechanism for moving said carriage for letter-spacing, a type-frame pivotally mounted in the carriage and arranged to rock about a horizontal axis, and a series of type-bars carried by said frame, each bar being provided with two or more printing characters having their faces in different planes.

12. In a type-writing machine, the combination with machine-guideways supported independently of and apart from the printing bed or surface, of a writing-machine adjustably mounted upon said guideways and comprising carriage guide-rails arranged transversely of the machine-guideways, a type-frame carriage supported upon said guide-rails above the printing-surface, a type-frame pivotally mounted in the carriage and arranged to rock about a horizontal axis, and a series of type-bars and operating-keys therefor carried by said frame, each bar being provided with two or more printing characters having their faces in different planes.

13. In a type-writing machine, the combination with a suitable support of a tilting carriage-frame pivotally connected thereto and arranged to rock about a horizontal axis, a type-frame carriage supported by said frame, mechanism for moving said carriage for letter-spacing, a type-frame pivotally connected to said carriage and arranged to rock about a horizontal axis, and type-bars carried by said type-frame, said bars being each provided with two or more printing characters having their faces arranged in different planes.

14. In a type-writing machine, the combination with a suitable support, of a tilting carriage-frame pivotally connected thereto and arranged to rock about a horizontal axis, a type-frame carriage supported by said frame, mechanism for moving said carriage for letter-spacing, a type-frame pivotally connected to the carriage and arranged to rock about a horizontal axis, and type-bars and operating-keys therefor carried by said type-frame, said bars being each provided with two or more printing characters having their faces arranged in different planes.

15. In a type-writing machine, the combination with platen-guideways, a platen and mechanism for adjusting said platen longitudinally of said guideways for line-spacing, of a main supporting-frame, a tilting carriage-frame pivotally connected thereto and arranged above the platen, said carriage-frame being arranged to rock about a horizontal axis, a carriage supported by said carriage-frame, mechanism for moving said carriage for letter-spacing, a type-frame pivotally connected to the carriage and arranged to rock about a horizontal axis, and type-bars carried by said type-frame, said bars being each provided with two or more printing characters having their faces arranged in different planes.

16. In a type-writing machine, the combination with platen-guideways, a platen and mechanism for adjusting said platen longitudinally of said guideways for line-spacing, of a machine-supporting frame, a tilting carriage-frame pivotally connected thereto above the platen and arranged to rock about a horizontal axis, a type-frame carriage supported by said tilting carriage-frame, mechanism for moving said carriage for letter-spacing, a type-frame pivotally connected to the carriage and arranged to rock about a horizontal axis, and type-bars and operating-keys therefor carried by said type-frame, said bars being each provided with two or more printing characters having their faces arranged in different planes.

17. In a type-writing machine, the combination with machine-guideways and a supporting-frame movable thereon, of a tilting carriage-frame pivotally connected to said supporting-frame and arranged to rock about a horizontal axis, a type-frame carriage mounted upon the tilting carriage-frame, mechanism for moving said carriage for letter-spacing, a type-frame journaled in the carriage and arranged to rock about a horizontal axis, and type-bars carried by said type-frame, said bars being each provided with two or more printing characters having their faces arranged in different planes.

18. In a type-writing machine, the combination with machine-guideways, a supporting-frame movable thereon, and mechanism for moving said frame longitudinally of said ways for line-spacing, of a tilting carriage-frame pivotally connected to said supporting-frame and arranged to rock about a horizontal axis, a type-frame carriage mounted upon said carriage-frame, mechanism for moving said carriage for letter-spacing, a type-frame journaled in the carriage and arranged to rock about a horizontal axis, and type-bars carried by said type-frame, said bars being each provided with two or more printing characters having their faces arranged in different planes.

19. In a type-writing machine, the combination with platen-guideways, a platen and mechanism for adjusting said platen longitudinally of said guideways for line-spacing, of machine-guideways arranged parallel with the platen-guideways, a supporting-frame movable on said machine-guideways, mechanism for moving said supporting-frame longitudinally of the ways for line-spacing, a tilting carriage-frame hinged to said supporting-frame and arranged to rock about a horizontal axis, a type-frame carriage mounted upon the supporting-frame, mechanism for moving said carriage for letter-spacing, and type-bars and operating-keys therefor supported by said carriage.

20. In a type-writing machine, the combination with platen-guideways, a platen and mechanism for adjusting said platen longitudinally of said guideways for line-spacing, of machine-guideways arranged parallel with the platen-guideways, a supporting-frame movable on said machine-guideways, mechanism for moving said supporting-frame longitudinally of the ways for line-spacing, a tilting carriage-frame hinged to said supporting-frame and arranged to rock about a horizontal axis, a carriage mounted upon said carriage-frame, mechanism for moving said carriage for letter-spacing, a type-frame journaled in the carriage and arranged to rock about a horizontal axis, and a series of type-bars carried by said type-frame, said bars being each provided with two or more printing characters having their faces arranged in different planes.

21. In a type-writing machine, the combination with platen-guideways, a platen and mechanism for adjusting said platen longitudinally of said guideways for line-spacing, of machine-guideways arranged parallel with the platen-guideways, a supporting-frame movable on said machine-guideways, mechanism for moving said supporting-frame longitudinally of the ways for line-spacing, a tilting carriage-frame hinged to said supporting-frame and arranged to rock about a horizontal axis, a carriage mounted upon said carriage-frame, mechanism for moving said carriage for letter-spacing, a type-frame journaled in the carriage and arranged to rock about a horizontal axis, and a series of type-bars and operating-keys therefor carried by said type-frame, said bars being each provided with two or more printing characters having their faces arranged in different planes.

22. In a type-writing machine, the combination with carriage-guideways, a type-frame carriage movable upon said guideways and escapement mechanism one member of which is movable with said carriage, of a type-frame pivotally mounted in the carriage, key-levers carried by said type-frame, a universal bar arranged in operative relation to said key-levers and adapted to rock with the type-frame, and flexible connections between said universal bar and the movable member of the escapement mechanism permitting said bar and type-frame to rock without operating the escapement mechanism.

23. In a type-writing machine, the combination with carriage-guideways and a carriage movable upon said guideways of a type-frame pivotally mounted in the carriage, key-levers carried by said type-frame, a universal bar arranged in operative relation to said levers and adapted to rock with the type-frame, escapement mechanism comprising a dog and a rack, one member of said mechanism being movable with the carriage, and flexible connections between said movable member and the universal bar permitting said bar and type-frame to rock without operating the escapement mechanism.

24. In a type-writing machine, the combination with carriage-guideways and a type-frame carriage movable upon said guideways of a type-frame pivotally mounted in the carriage, key-levers carried by said type-frame, a universal bar arranged in operative relation to said levers and adapted to rock with the type-frame, a link connecting said universal bar with the type-frame, escapement mechanism comprising two members, one of which is movable with the carriage, and flexible connections between said movable member and universal bar permitting said bar to rock with the type-frame without operating the escapement mechanism.

25. In a type-writing machine, the combination with carriage-guideways and a type-frame carriage movable upon said guideways, of a type-frame pivotally mounted in the carriage, key-levers carried by said type-frame, a universal bar arranged in operative relation to said levers and adapted to rock with the type-frame, a link connecting said universal bar with the type-frame, escapement mechanism comprising two members, one of which is movable with the carriage, a lever pivoted to the carriage and supporting said movable member, and a rod hinged to said lever and connected to the universal bar.

26. In a type-writing machine, the combination with carriage-guideways and a type-frame carriage movable upon said guideways, of a type-frame pivotally mounted in the carriage, key-levers carried by said type-frame, a universal bar arranged in operative relation to said levers and adapted to rock with the type-frame, a link connecting said universal bar with the type-frame, escapement mechanism comprising two members, one of which is movable with the carriage, a lever pivoted to the carriage, a link connecting said lever with the movable member of the escapement mechanism, and a rod pivotally connected to said lever and connected to the universal bar.

27. In a type-writing machine, the combination with carriage-guideways of a type-frame carriage movable upon said guideways, a type-frame pivotally mounted in the carriage, key-levers carried by said type-frame, a universal bar arranged in operative relation to said levers, a link connecting said bar with the type-frame, escapement mechanism comprising two members, one of which is movable with the carriage, a link connecting said movable member with the carriage, and flexible connections between said link and universal bar permitting the type-frame to rock without operating the escapement mechanism.

28. In a type-writing machine, the combination with carriage-guideways of a type-frame carriage movable upon said guideways, a type-frame pivotally mounted in the carriage, key-levers carried by said type-frame, a universal bar extending transversely of the machine in operative relation to said key-levers, a pair of links connecting the opposite ends of said universal bar with the type-frame, a rod extending transversely of the machine, escapement mechanism comprising two members, one of which is supported by said rod, and flexible connections between said rod and the universal bar permitting the type-frame to rock without operating the escapement mechanism.

29. In a type-writing machine, the combination with carriage-guideways, of a type-frame carriage movable upon said guideways, a type-frame pivotally mounted in the carriage, key-levers carried by said type-frame, a universal bar in operative relation to said key-levers, a pair of links connecting the opposite ends of said universal bar with the type-frame, a rod extending transversely of the machine, escapement mechanism comprising two members, one of which is supported by said transverse rod, a pair of levers pivoted at opposite sides of the carriage, links connecting said levers with said transverse rod, and rods hinged to said levers and connected to the universal bar.

30. In a type-writing machine the combination with carriage-guideways and a rack, of a type-frame carriage movable upon said guideways, a type-frame pivotally mounted in the carriage, key-levers carried by said type-frame, a universal bar extending transversely of said machine in operative relation to said key-levers, a pair of links connecting the opposite ends of said universal bar with the type-frame, a rod extending transversely of the machine, a dog carried by said rod and engaging the rack, a pair of links connecting the ends of said rod with the carriage, a pair of levers pivoted to the carriage, links connecting said levers with said rod, and rods hinged to said levers and connected to the universal bar.

31. In a type-writing machine, the combination with carriage-guideways and a rack, of a type-frame carriage movable upon said guideways, a type-frame pivotally mounted in said carriage, key-levers carried by said type-frame, a universal bar arranged in operative relation to said key-levers and adapted to rock with the type-frame, a lever pivoted to the type-frame, a rod connecting the free end of said lever with the universal bar, a link connected to said lever near its pivotal point on the carriage, and a dog connected to said latter link and engaging the rack.

32. In a type-writing machine, the combination with guide-rails and a type-frame carriage movable thereon, of a type-frame pivoted to said carriage, longitudinally-movable type-bars and key-levers therefor carried by said type-frame, and means for giving said carriage a step-by-step motion for letter-spacing.

33. In a type-writing machine, the combination with guide-rails and a rack, of a type-frame carriage movable upon the rails, a vertically-arranged type-frame pivotally secured to the carriage, longitudinally-movable type-bars and key-levers therefor carried by said type-frame, a universal bar arranged to rock with the type-frame, a dog engaging said rack, and flexible connections between said dog and universal bar.

34. In a type-writing machine, the combination with guide-rails, a type-frame carriage movable thereon transversely of the printing bed or surface and letter-spacing mechanism for the carriage, of a vertically-arranged type-frame pivoted near its lower end to said carriage, a series of radially-arranged type-bars carried by said type-frame, a corresponding series of key-levers fulcrumed on said type-frame, and connections between said key-levers and type-bars for operating the latter.

35. In a type-writing machine, the combination with guide-rails, a type-frame carriage thereon and letter-spacing mechanism, of a type-frame pivotally mounted in said carriage, a series of radially-arranged type-bars carried by said type-frame, a corresponding series of key-levers fulcrumed upon said frame, a series of intermediate levers fulcrumed upon said frame, each intermediate lever having one end operatively connected to a type-bar, and links connecting the opposite ends of said intermediate levers with the key-levers.

36. In a type-writing machine, the combination with guide-rails, a type-frame carriage thereon and letter-spacing mechanism, of a type-frame pivotally mounted in said carriage, a series of radially-arranged type-bars carried by said type-frame, a corresponding series of key-levers fulcrumed upon said frame, a series of intermediate levers fulcrumed upon said frame, each intermediate lever having one end operatively engaging a type-bar, links connecting the opposite ends of said intermediate levers with the key-levers, and springs holding said levers and type-bars in their normal positions.

37. In a type-writing machine, the combination with guide-rails, a type-frame carriage thereon and letter-spacing mechanism, of a type-frame pivotally mounted in said carriage, a series of radially-arranged type-bars carried by said type-frame, a series of key-levers fulcrumed upon said frame, an arched fulcrum-bar extending transversely of said frame, a series of intermediate levers journaled upon said bar, each intermediate lever having one of its ends operatively connected to a type-bar, and links connecting the opposite ends of said intermediate levers with the key-levers.

38. In a type-writing machine, the combination with guide-rails, a type-frame carriage thereon and letter-spacing mechanism, of a type-frame pivotally mounted in said carriage, a series of radially-arranged type-bars carried by said type-frame, a series of key-levers fulcrumed upon said frame, an arched fulcrum-bar extending transversely of said frame, a series of intermediate levers journaled upon said bar, each intermediate lever having one of its ends operatively connected to a type-bar, links connecting the opposite ends of said intermediate levers with the key-levers, and springs arranged to hold said levers and type-bars in their normal positions.

39. In a type-writing machine, the combination with guide-rails, a type-frame carriage thereon and letter-spacing mechanism, of a type-frame pivotally mounted in the carriage, a series of type-bars radially arranged in said frame, a corresponding series of key-levers fulcrumed on said frame, an arched fulcrum-bar extending transversely of the frame, intermediate levers journaled upon said fulcrum-bar, each intermediate lever having one of its ends engaging a type-bar, links connecting said intermediate levers with the key-levers, an arched spring-supporting bar extending transversely of said frame, and spring-fingers carried by said latter bar and bearing against the intermediate levers.

40. In a type-writing machine, the combination with guide-rails, a type-frame carriage movable thereon transversely of the printing bed or surface and letter-spacing mechanism for said carriage, of a vertically-arranged type-frame pivotally connected to said carriage and adapted to rock about a horizontal axis, and stops upon the carriage arranged to limit the movement of the type-frame.

41. In a type-writing machine, the combination with guide-rails, a type-frame carriage and letter-spacing mechanism, of a vertically-arranged type-frame pivotally connected to said carriage and adapted to rock about a horizontal axis, a stop upon said carriage, and a spring arranged to hold the type-frame against said stop.

42. In a type-writing machine, the combination with guide-rails, a type-frame carriage and letter-spacing mechanism, of a vertically-arranged type-frame pivotally connected to said carriage and adapted to rock about a horizontal axis, a stop upon said carriage, and a shifting-key having a latch arranged to lock the type-frame in position against said stop.

43. In a type-writing machine, a type-frame carriage, a vertically-arranged type-frame pivotally mounted in said carriage, a fulcrum-bar extending transversely across the upper portion of said type-frame, said fulcrum-bar having a series of vertical slots therein, key-levers arranged within said slots, a guard securing said key-levers within said slots, and type-bars mounted in said frame and operatively connected to said key-levers.

44. In a type-writing machine, a supporting-frame, a tilting carriage-frame journaled in said supporting-frame, a rack arranged adjacent to the axis of the carriage-frame, a type-frame carriage movable upon the carriage-frame, a dog movable with said carriage and engaging the rack, a tilting type-frame journaled in the carriage-frame, key-levers on said type-frame, and connections between said key-levers and dog for operating the latter.

45. In a type-writing machine, a supporting-frame, a tilting carriage-frame having a transverse bar journaled at its ends in said supporting-frame, a rack upon said bar, a type-frame carriage movable upon the carriage-frame, a dog movable with said carriage and engaging the rack, a tilting type-frame, key-levers on said type-frame and connections between said key-levers and dog for operating the latter.

46. In a type-writing machine, the combination with guide-rails arranged transversely of the printing bed or surface, a type-frame carriage movable along said rails, and a type-frame pivotally connected to said carriage, of longitudinally-movable type-bars arranged in said type-frame radial to the printing-point, each of said type-bars having a type-head at one end arranged perpendicular to the printing-surface, and each head having several printing characters thereon with their faces lying in planes at angles to one another.

47. In a type-writing machine, the combination with a vertically-arranged pivotally-mounted type-frame having a pair of opposing guide-plates at its lower end and a pair of guide-blocks on each plate converging toward the printing-point, one pair of guide-blocks being lower than the other, of longitudinally-movable type-bars arranged in said frame radial to the printing-point, each type-bar having a type-head at one end arranged perpendicular to the printing-surface, and each head having several printing characters thereon with their faces lying in planes at an angle to one another.

48. The combination with platen-guideways, a flat platen, and means for spacing said platen longitudinally of said guideways, of a writing-machine supported above the platen, said machine comprising a carriage movable transversely of the platen-guideways, type-bars movable with the carriage, each bar having two or more printing characters with their faces arranged in different planes, means for impressing either character upon a bar against the printing-surface, and means for moving said carriage transversely of said guideways for letter-spacing.

In testimony whereof I affix my signature in presence of two witnesses.

JAMES H. W. MARRIOTT.

Witnesses:
ROBERT WATSON,
ALEXANDER S. STEUART.